United States Patent
Kulkarni et al.

(10) Patent No.: US 9,301,334 B2
(45) Date of Patent: Mar. 29, 2016

(54) METHOD OF OPERATING RADIO COMMUNICATIONS SYSTEMS USING SDR (SOFTWARE DEFINED RADIO) RADIO STATIONS

(75) Inventors: Vivek Kulkarni, Unterhaching (DE); Jijun Luo, München (DE); Vishal Sankhla, Santa Clara, CA (US)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 1459 days.

(21) Appl. No.: 11/578,581

(22) PCT Filed: Apr. 11, 2005

(86) PCT No.: PCT/EP2005/051583
§ 371 (c)(1),
(2), (4) Date: Jul. 16, 2007

(87) PCT Pub. No.: WO2005/101860
PCT Pub. Date: Oct. 27, 2005

(65) Prior Publication Data
US 2007/0258423 A1 Nov. 8, 2007

(30) Foreign Application Priority Data
Apr. 16, 2004 (DE) .......................... 10 2004 018 574

(51) Int. Cl.
*H04W 4/00* (2009.01)
*H04W 88/04* (2009.01)
(Continued)

(52) U.S. Cl.
CPC .............. *H04W 88/04* (2013.01); *H04W 8/245* (2013.01); *H04W 84/18* (2013.01)

(58) Field of Classification Search
CPC ..... H04W 84/18; H04W 40/02; H04W 40/12; H04W 40/246; H04W 36/0011; H04W 40/20; H04W 84/20; H04W 92/02; H04W 28/02; H04W 16/14; H04W 24/02; H04W 92/18; H04W 12/04; H04W 36/26; H04W 28/18
USPC ......... 370/328, 338, 231, 312, 315, 501, 492; 455/411, 16, 13.1, 41.2, 502, 507; 713/156
See application file for complete search history.

(56) References Cited

U.S. PATENT DOCUMENTS 5,940,504 A 8/1999 Griswold
6,052,600 A 4/2000 Fette et al.
(Continued)

FOREIGN PATENT DOCUMENTS

| WO | 03/017706 A1 | 2/2003 |
| WO | 03/094025 A1 | 11/2003 |
| WO | 2004/015904 A3 | 2/2004 |

OTHER PUBLICATIONS

International Search Report for PCT Application No. PCT/EP2005/051583; mailed Nov. 28, 2005.

*Primary Examiner* — Kwasi Karikari
(74) *Attorney, Agent, or Firm* — Squire Patton Boggs (US) LLP

(57) ABSTRACT

Authorization data is sent to radio stations so that the radio stations are temporarily authorized, by way of the authorization data, to communicate using radio access technology. Messages can be transmitted between a first radio station and a second radio station via a path that runs via one or more additional radio stations. The authorization data is sent such that, while a message is transmitted via the path using radio access technology, at any point in time a subset of adjacent radio stations on the path are authorized to communicate using radio access technology.

19 Claims, 1 Drawing Sheet

(51) Int. Cl.
  *H04W 8/24*  (2009.01)
  *H04W 84/18*  (2009.01)

(56) References Cited

U.S. PATENT DOCUMENTS

| | | | |
|---|---|---|---|
| 6,567,855 B1 | 5/2003 | Tubbs et al. | |
| 7,266,685 B1* | 9/2007 | Meandzija et al. | 713/156 |
| 7,499,443 B2* | 3/2009 | Suzuki | 370/349 |
| 2003/0032417 A1 | 2/2003 | Minear et al. | |
| 2003/0050073 A1 | 3/2003 | Wasko | |
| 2003/0163686 A1* | 8/2003 | Ward et al. | 713/156 |
| 2004/0005058 A1* | 1/2004 | Jang et al. | 380/270 |
| 2004/0017829 A1 | 1/2004 | Gray et al. | |
| 2004/0053609 A1* | 3/2004 | Karaoguz et al. | 455/424 |
| 2005/0100166 A1* | 5/2005 | Smetters et al. | 380/277 |
| 2005/0215234 A1* | 9/2005 | Fukuzawa et al. | 455/411 |

* cited by examiner

METHOD OF OPERATING RADIO COMMUNICATIONS SYSTEMS USING SDR (SOFTWARE DEFINED RADIO) RADIO STATIONS

CROSS REFERENCE TO RELATED APPLICATIONS

This application is based on and hereby claims priority to German Application No. 10 2004 018 574.3 filed on Apr. 16, 2004, the contents of which are hereby incorporated by reference.

BACKGROUND

Described below is a method for operating radio communications systems in which authorization data is sent to radio stations so that the radio stations are authorized, by way of the authorization data, to communicate using a radio access technology and devices for implementing the method.

In radio communications systems, messages, for example voice data, image data, video data, SMS (short message service), MMS (multimedia messaging service) or signaling data, are transmitted with the aid of electromagnetic waves via a radio interface between a sending radio station and a receiving radio station. Depending on the specific layout of the radio communications system, the radio stations here can be different types of subscriber radio stations or network-side radio devices such as repeaters, base stations or radio access points. In a mobile radio communications system, at least some of the subscriber radio stations are mobile radio stations.

Current subscriber radio stations are generally hardware-based so that the radio access technologies which a subscriber radio station can use for communicating are severely restricted in number and cannot be changed. The result of this is, for example, that where a new radio standard or optionally also a new type of service is introduced, new subscriber radio stations also have to be made available. With SDR (software defined radio) subscriber radio stations, on the other hand, software modules run on generic hardware platforms which control the functions required for radio communications such as generating a signal to be sent and detecting a received signal. Thus, an SDR subscriber radio station can, depending on what software is available to it, communicate using a variety of radio access technologies.

The software needed for communicating using a radio access technology can be made available to the subscriber radio stations by the operator of the radio communications system.

In order to be allowed to use the software, the operator must make payments to the producer of the software. A payment can be made in the context of software licenses so that, for example, an operator can purchase software licenses for a certain number of subscriber radio stations. The operator can then authorize subscriber radio stations, by sending authorization data, to communicate using the respective radio access technology. The authorization data can be, for example, the ready-to-use software itself or else a key or code which enables use of the software stored by the subscriber radio station. Depending on the specific embodiment, authorization data can enable use of the respective radio access technology temporarily or permanently. If the number of software licenses available in the radio communications system is limited, then there is the problem that as a rule not all radio stations in the SDR radio communications system can communicate simultaneously using the licensed radio access technology. The operator must consequently select which radio stations are permitted to use the licensed radio access technology at any point in time.

SUMMARY

An aspect involves methods for operating radio communications systems, in which radio stations are authorized, by way of authorization data, to communicate using a radio access technology, which methods take into account the fact that not all the radio stations are to be authorized to communicate using a radio access technology simultaneously. Furthermore, suitable devices for implementing the methods are to be indicated.

In the method for operating a radio communications system described below, authorization data is sent to radio stations so that the radio stations are temporarily authorized, by way of the authorization data, to communicate using a radio access technology. Messages can be transmitted between a first radio station and a second radio station via a path that runs via one or more further radio stations. The authorization data is sent such that, whilst a message is transmitted via the path using the radio access technology, at any point in time a subset of adjacent radio stations on the path is authorized to communicate using the radio access technology.

The authorization data does not simply represent permission to communicate using the radio access technology, as does, for example, an assignment of radio resources for communicating using the radio access technology, rather without the authorization data the radio stations cannot be used such that communication is possible using the radio access technology. For example, the authorization data can release at least for a period software stored by an SDR radio station, in which case the authorization data can contain a key or code which enables use of or running of the stored software. The authorization of the radio stations to communicate using the radio access technology is temporary, and this can for example be achieved whereby receipt of the authorization data enables a radio station to use the radio access technology only for a defined time span or a defined period, or whereby the authorization data includes a message pair so that communication using the radio access technology is possible between receipt of the first message and the second message of the pair. Methods known in the art can be employed for sending and activating authorization data, as are used, for example, for releasing computer software. The authorization data can be sent, for example, via radio using a different radio access technology from that to which the authorization data relates.

A radio access technology stipulates the operations to be carried out at the sender end for processing and sending data and the operations to be carried out at the receiver end for receiving and processing signals. As a rule, the radio access technologies of different radio communications standards such as, for example, GSM (Global System For Mobile Communication), GPRS (General Packet Radio Service), EDGE (Enhanced Data Rate For GSM Evolution), TSM (Time Division Synchronous Code Division Multiple Access), DECT (Digital European Cordless Telephone), IS95 (Interim Standard No. 95), cdma2000, UMTS (Universal Mobile Telecommunications System), IEEE 802.11 and Bluetooth, as well as future fourth-generation systems, differ from one another.

In the radio communications system under consideration messages can be transmitted from radio station to radio station by forwarding of the messages by other radio stations via a path. These radio stations can, in particular, be subscriber radio stations and/or network-side repeaters. The radio stations on the path in this case are the sender of the message, the forwarding radio stations and the recipient of the message. Adjacent radio stations can communicate with one another directly without any forwarding of messages between them being required. Consequently, each radio station is located in the radio coverage area of stations adjacent to it. When a message is transmitted via a path, a subset of adjacent radio stations is authorized to communicate using a radio access technology. This subset constitutes a continuous section of the radio stations on the path, but not all the radio stations on the path. The composition of the subset is not fixed but can change in the course of message transmission via the path.

One advantage of the method described below is that an operator of a radio communications system who wishes to enable message transmission between radio stations via a path, can make do with a number of licenses for the radio access technology used for the transmission of messages via the path that is lower than the number of radio stations on the path.

In a further development, the authorization data is sent such that, whilst a message is transmitted via the path using the radio access technology, at any point in time two adjacent radio stations on the path are authorized to communicate using the radio access technology. In this case, precisely two radio stations are authorized to communicate using the radio access technology, namely those radio stations between which the message is currently being sent or forwarded. This authorization can then in the course of message transmission be transferred or forwarded to other radio stations.

It is advantageous if the authorization data for message transmission is sent via the path by a network-side device. Such a network-side device can be, for example, a base station of a cellular radio communications system which has an ad-hoc mode or else a radio access point of a WLAN (Wireless Local Area Network).

In a further development, the authorization data for message transmission is sent via the path at least in part by radio stations on the path. In this case, a radio station currently authorized to communicate using the radio access technology can pass on its authorization to another radio station.

The device for a radio communications system sends authorization data to radio stations on a path so that the radio stations are temporarily authorized, by way of the authorization data, to communicate using a radio access technology. Here, messages can be transmitted between a first radio station and a second radio station via the path that runs via one or more additional radio stations. The authorization data is sent such that, whilst a message is transmitted via the path using the radio access technology, at any point in time a subset of adjacent radio stations on the path is authorized to communicate using the radio access technology.

The device can be realized by a first device which decides about the sending of the authorization data and a second device, connected to the first, which implements the sending. The device is suitable in particular for implementing the described method, this also being true of the embodiments and further developments.

In the described method for operating a radio communications system, authorization data is sent to radio stations so that the radio stations are authorized at least temporarily, by way of the authorization data, to communicate using a radio access technology. The authorization data is sent to at least one radio station depending on at least one measurement result of the at least one radio station pertaining to radio resources available for the radio access technology.

The above observations apply with regard to the authorization of radio stations by way of the authorization data. The authorization to communicate using the radio access technology can, however, also be permanent.

The above comments apply with regard to the radio access technologies.

Whether authorization data is sent to the at least one radio station or not depends on a measurement result. This measurement result can be sent by the radio station, for example in the form of a measurement report, to a device which decides about the sending of the authorization data or to a device which forwards the measurement result to the device with decision-making powers. The decision about the sending of the authorization data can, for example, be made by comparing measurement values with a threshold value, it being possible, for example, for the authorization data to be sent if the threshold value is not exceeded by a measurement value. A measurement result can, for example, be a signal level or a signal-to-noise ratio. Radio resources available for the radio access technology can in particular be a radio frequency which can be used in the radio communications system for the radio access technology.

The method has the advantage that an operator who has only a limited number of licenses for a certain radio access technology can select those radio stations which he wants to authorize to use this radio access technology with the aid of measurement results available to him for the radio stations. Consequently, those radio stations can advantageously be selected which are expected to maintain communication with high-quality transmission using the radio access technology.

In an embodiment, the at least one radio station is, depending on measurement results pertaining to radio resources available for the radio access technology, dynamically authorized to communicate using the radio access technology. This means that authorization can be granted and withdrawn again and optionally granted anew depending on measurement results. Switching between authorized and unauthorized status is thus triggered at least in part by measurement results.

In a further development, the at least one measurement result relates to at least one signal broadcast using the radio access technology by at least one radio station and/or by at least one base station, and the authorization data is sent from a base station of a cellular radio communications system to the at least one radio station. The signal which is measured by the radio station can originate from one or more radio stations which can be located inside the radio cell of the same or another base station in which the at least one radio station is located. Furthermore, a measured signal can originate from the base station within the radio cell of which the at least one radio station is located or from one or more other base stations. It is advantageous if a base station sends the authorization data to all the radio stations within its radio cell whose measurement results satisfy a certain condition.

The device for a radio communications system decides about the sending of authorization data which authorizes at least temporarily at least one radio station to communicate using a radio access technology to the at least one radio station. Here, the decision is made depending on at least one measurement result of the at least one radio station pertaining to radio resources available for the radio access technology.

The device can also send the authorization data, or arrange for the sending to another device. The device described below is suitable, in particular, for implementing the described method, this also being true of the embodiment and further developments.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
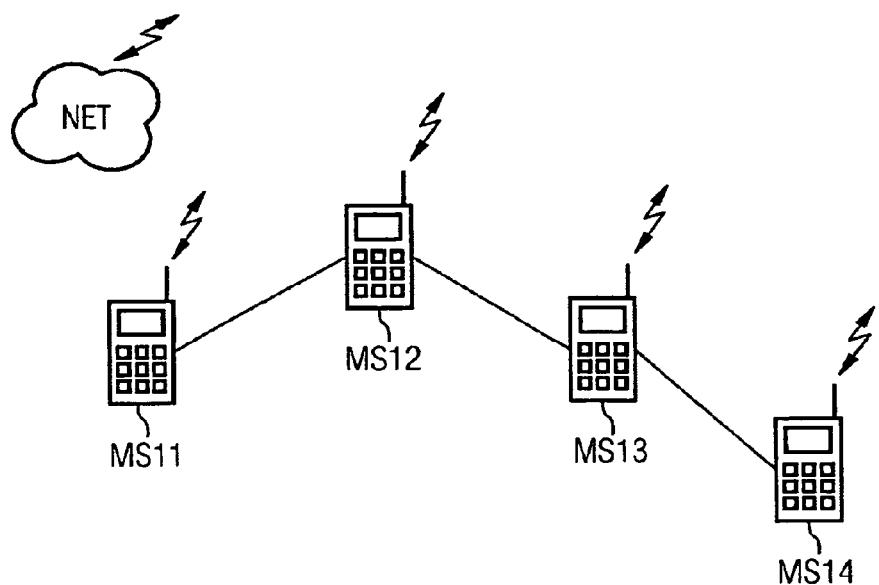
FIG. 1 is a block diagram of a portion of a first SDR radio communications system.

Reference will now be made in detail to the preferred embodiments, examples of which are illustrated in the accompanying drawings, wherein like reference numerals refer to like elements throughout.

SDR radio communications systems are examined below. It is assumed that the operator of these radio communications systems has purchased a certain number of licenses for the use of software which enables communication by subscriber radio stations using a certain radio access technology. For cost reasons, however, the operator does not possess sufficient software licenses in order to allow every subscriber radio station in his radio communications system to use the software simultaneously. He makes the incomplete software available to the subscriber radio stations so that the subscriber radio stations need additional information to use the software. This additional information, comprising e.g. a suitable key or code, is made available to the subscriber radio stations in the form of authorization data. The authorization data enables the subscriber radio stations to communicate permanently or for a limited period using the radio access technology connected with the licensed software.

Firstly, an SDR radio communications system is considered in which subscriber radio stations can communicate with one another directly in accordance with an ad-hoc mode. The extract of the radio communications system shown in FIG. 1 comprises the four subscriber-side mobile stations MS11, MS12, MS13 and MS14. These can communicate with one another and with one or more radio devices of the infrastructural network NET of the radio communications system via radio, symbolized by arrows. The mobile station MS11 intends to transmit a message to the mobile station MS14. Since the two mobile stations MS11 and MS14 are not adjacent mobile stations, the message is transmitted via a path which runs via the two mobile stations MS12 and MS13. Here, the message is transmitted in each case between adjacent pairs of mobile stations on the path, firstly between the mobile station MS11 and the mobile station MS12, then between the mobile station MS12 and the mobile station MS13, and finally between the mobile station MS13 and the mobile station MS14. The path between the mobile stations MS11 and MS14 can be determined by methods known in the art, and it is assumed that the path is known to the infrastructural network NET and/or to one or more mobile stations MS11, MS12, MS13 and MS14.

Messages are to be transmitted between the mobile station MS11 and the mobile station MS14 using the radio access technology for which the operator possesses a limited number of software licenses. In order to have to use as few licenses as possible for transmitting messages between the mobile station MS11 and the mobile station MS14, authorization data is sent to the mobile stations MS11, MS12, MS13 and MS14 so that at any point in time during the message transmission precisely two adjacent mobile stations in each case can use the licensed radio access technology. Firstly, the two mobile stations MS11 and MS12 are temporarily authorized by the authorization data to use the licensed radio access technology. Following the message transmission between the mobile station MS11 and the mobile station MS12, the authorization is withdrawn from the mobile station MS11 and transferred to the mobile station MS13. The message is transmitted between the mobile stations MS12 and MS13, whereupon the authorization to use the licensed radio access technology is transferred from the mobile station MS12 to the mobile station MS14. Following transmission of the message between the mobile stations MS13 and MS14, the authorization can also be withdrawn from the mobile stations MS13 and MS14. In this way, for message transmission between any number of mobile stations only two licenses for the radio access technology used are needed.

The described method, in which two licenses are used for transmitting a message via a path, can be applied by analogy to the case where more than two licenses, but fewer licenses than the number of mobile stations on the path, are to be used. In this case, too, there is a continuous chain of mobile stations to which authorization has been granted that is shorter than the overall path. The authorization is withdrawn from a mobile station which has completed the sending of the message and is passed on to the next mobile station for which authorization is not yet available.

It is possible for the authorization data to be sent exclusively by a network-side device in the infrastructural network NET. Here, a different radio access technology from the licensed radio access technology can be used for communicating with the mobile stations MS11, MS12, MS13 and MS14. One possibility lies in the use of authorization data which authorizes the mobile stations to use the licensed radio access technology only for a limited time span. The network-side device can send the authorization data e.g. to the mobile station MS13 when the time span during which the mobile station MS11 is authorized has expired. Another possibility is that the mobile station MS11 informs the network-side device about the message that has been sent to the mobile station MS12, whereupon the network-side device send authorization data to the mobile station MS11 which withdraws authorization to communicate using the licensed radio access technology from the mobile station MS11, while authorization data is sent to the mobile station MS13 which authorizes the mobile station MS13 to use the licensed radio access technology.

Another possibility is that authorization data is exchanged between the mobile stations, it being possible to use a different radio access technology from the licensed radio access technology for this purpose. For example, the mobile station MS11, after successfully transmitting a message to the mobile station MS12, can transmit authorization data to the mobile station MS13 via the mobile station MS12 which authorizes the mobile station MS13 to use the licensed radio access technology. After receiving the authorization data, the mobile station MS13 confirms receipt of the authorization data to the mobile station MS11. This confirmation of receipt corresponds, in relation to the mobile station MS11, to authorization data which withdraws authorization to communicate using the licensed radio technology from the mobile station MS11 It is, however, also possible for the authorization to use the licensed radio access technology to be withdrawn from the mobile station MS11 by sending the authorization data.

Figure 2:
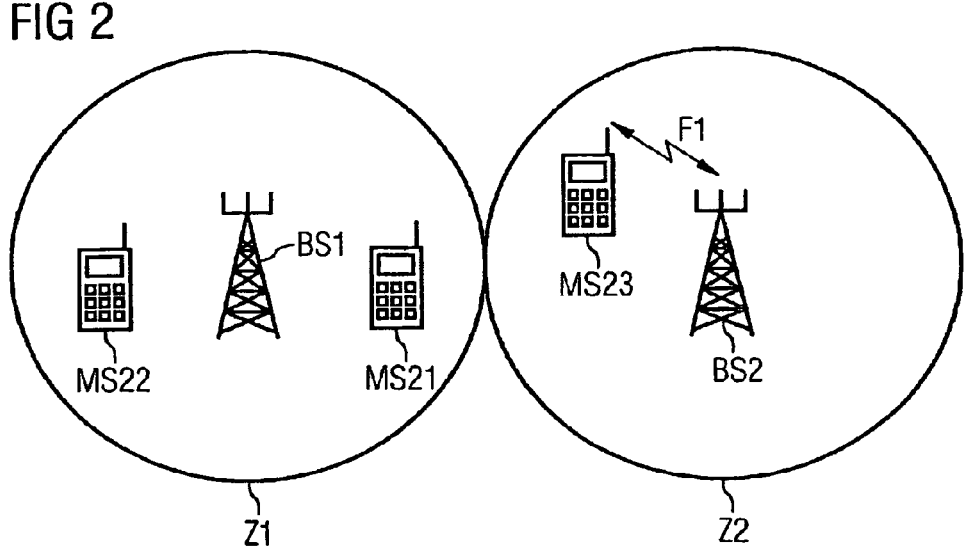
FIG. 2 is a block diagram of a portion of a second SDR radio communications system.

FIG. 2 shows an extract from a cellular SDR radio communications system which comprises the two radio cells Z1 and Z2 of the base stations BS1 and BS2. The mobile stations MS1 and MS2 are located in the radio cell Z1 of the base station BS1, and the mobile station MS23 is located in the radio cell Z2 of the base station BS2. The radio access technology licensed by the operator uses a radio frequency F1 for communication between base stations and mobile stations.

The mobile station MS23 was authorized by the base station BS2, by the sending of authorization data, to communicate using the licensed radio access technology. The mobile stations MS21, MS22 and MS23 measure at regular time intervals the reception level on the radio frequency F1. Since no communication takes place on the radio frequency F1 in the area surrounding the mobile station MS22, the mobile station measures a low signal level and reports this measurement result to the base station BS1. The mobile station MS21, by contrast, in the area around which the mobile station MS22 communicates with the base station BS2 on the radio frequency F1, measures a significantly higher signal level and forwards its measurement result to the base station BS1. As a limited number of software licenses are available in the radio communications system, the mobile stations authorized by way of authorization data to communicate using the licensed radio access technology are predominantly those which measure low signal levels on the radio frequency F1 used by the licensed radio access technology. This means that the decision about which mobile stations are authorized to communicate using the licensed radio access technology is made dependent on the expected transmission quality, the quality of service (QoS). In the example considered, the base station BS1 therefore sends authorization data to the mobile station MS22, and not to the mobile station MS21.

The procedure described with the aid of FIGS. 1 and 2 can also be applied to repeaters or extension points, i.e. to radio stations which forward signals to or from a base station and consequently expand the radio coverage area of the base station. Also, some of the radio stations which receive the authorization data can be subscriber radio stations and some network-side repeaters. An SDR extension point should, in accordance with the remarks above relating to FIG. 2, only be authorized by way of authorization data to use the licensed radio access technology if it experiences no interference or low interference on the radio frequency of the licensed radio access technology.

The method is not restricted to the use of a certain type of authorization data. With regard to the sending and putting into effect of authorization data, different types of methods known in the art can be used.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a cellular radio communications system, comprising:
    sending authorization data from a base station to mobile stations in the cellular radio communications system, whereby only a subset of the mobile stations are temporarily authorized, by way of the authorization data, to communicate using radio access technology to transmit messages between a first mobile station and a second mobile station via a path that runs via at least one additional mobile station,
    wherein the authorization data, which is shared among the first mobile station, the second mobile station, and the at least one additional mobile station on the path, is sent such that, while a message is transmitted via the path using the radio access technology, at any point in time only a given subset of the mobile stations on the path is authorized, by way of authorization data, to communicate using the radio access technology,
    wherein authorization is withdrawn from the first mobile station once the message is transmitted, and wherein any of the given subsets do not comprise all of the mobile stations on the path.

2. A method according to claim 1, wherein said sending of the authorization data activates two adjacent radio stations on the path to communicate using the radio access technology at any point in time while a message is transmitted via the path using the radio access technology.

3. A method according to claim 2, wherein the authorization data for message transmission is sent via the path by a network-side device.

4. A method according to claim 3, wherein the authorization data for message transmission is sent via the path at least in part by radio stations on the path.

5. A method according to claim 1,
    wherein the authorization data from the base station authorizes using software which activates to communicate using radio access technology to transmit messages between the first mobile station and the second mobile station via the path that runs via the at least one additional mobile station, and
    wherein the subset of adjacent mobile stations on the path are activated to communicate in accordance with an ad hoc mode.

6. A method according to claim 1, wherein the subset does not include all of the mobile stations in use.

7. A method according to claim 1, further comprising selecting the at least one additional mobile station in the subset of the mobile stations based on measurement results for the mobile stations pertaining to radio resources available for the radio access technology.

8. A method according to claim 7, wherein the measurement results include at least one of a signal level and a signal-to-noise ratio of at least one signal broadcast using the radio access technology by at least one of the mobile stations and/or by at least one base station.

9. A method according to claim 7, wherein said sending includes withdrawing authorization from a third mobile station included in the subset of the mobile stations and granting authorization to a fourth mobile station included in the subset of the mobile stations, based on changes in the measurement results, to maintain the path using the radio access technology via the subset of the mobile stations.

10. A method according to claim 1, wherein the temporary authorization is withdrawn from the first mobile station upon expiration of a validity period.

11. An apparatus comprising:
    at least one memory comprising computer program code;
    at least one processor;
    wherein the at least one memory and the computer program code are configured, with the at least one processor, to cause the apparatus at least to:
    initiate a transmission of authorization data from a base station to selected mobile stations in the cellular radio communications system on a path to temporarily authorize only a subset of the selected mobile stations, by way of the authorization data, which is shared among mobile stations on the path, to communicate using a radio access technology, so that messages can be transmitted between a first mobile station and a second mobile station via the path that runs via at least one further mobile station; and
    send the authorization data from a base station to the selected mobile stations, such that while a message is transmitted via the path using the radio access technology, at any point in time only a given subset of adjacent mobile stations on the path is authorized, by way of authorized data, to communicate using the radio access technology, wherein authorization is withdrawn from the first mobile station once the message is transmitted, wherein any of the given subsets do not comprise all of the mobile stations on the path.

12. An apparatus according to claim 11, wherein the subset of adjacent mobile stations on the path are activated to communicate in accordance with an ad hoc mode.

13. An apparatus according to claim 11, wherein the subset does not include all of the mobile stations in use.

14. An apparatus according to claim 11, wherein said initiating selects the selected mobile stations based on measurement results for the mobile stations pertaining to radio resources available for the radio access technology.

15. An apparatus according to claim 14, wherein the measurement results include at least one of a signal level and a signal-to-noise ratio of at least one signal broadcast using the radio access technology by at least one of the mobile stations and/or by at least one base station.

16. An apparatus according to claim 14, wherein said sending withdraws authorization from a third mobile station included in the selected mobile stations and grants authorization to a fourth mobile station included in the selected mobile stations, based on changes in the measurement results, to maintain the path using the radio access technology via the subset of the adjacent mobile stations.

17. An apparatus according to claim 11, wherein the temporary authorization is withdrawn from the first mobile station upon expiration of a validity period.

18. An apparatus comprising:
  at least one memory comprising computer program code;
  at least one processor;
  wherein the at least one memory and the computer program code are configured, with the at least one processor, to cause the apparatus at least to:
    receive authorization data from a base station at a first mobile station in the cellular radio communications system, whereby only a subset of a plurality of mobile stations are temporarily authorized, by way of the authorization data, to communicate using radio access technology to transmit messages between the first mobile station and a second mobile station via a path that runs via at least one additional mobile station; and
    transmit a message via the path using the radio access technology, where the authorization data, which is shared among the first mobile station, the second mobile station, and the at least one additional mobile station on the path, is applied such that at any point in time only a given subset of the mobile stations on the path is authorized, by way of authorization data, to communicate using the radio access technology,
  wherein the authorization of the first mobile station is deactivated once the first mobile station has transmitted the message, and wherein any of the given subsets do not comprise all of the mobile subscriber stations on the path.

19. A method, comprising:
  receiving authorization data from a base station at a first mobile station in the cellular radio communications system, whereby only a subset of a plurality of mobile stations are temporarily authorized, by way of the authorization data, to communicate using radio access technology to transmit messages between the first mobile station and a second mobile station via a path that runs via at least one additional mobile station; and
  transmitting a message via the path using the radio access technology, where the authorization data, which is shared among the first mobile station, the second mobile station, and the at least one additional mobile station on the path, is applied such that at any point in time only a given subset of the mobile stations on the path is authorized, by way of authorization data, to communicate using the radio access technology,
  wherein the temporary authorization of the first mobile station is withdrawn once the first mobile station has transmitted the message, and wherein any of the given subsets do not comprise all of the mobile subscriber stations on the path.

* * * * *